Feb. 2, 1960  R. E. WILSON ET AL  2,923,818
GATE-FORMING CIRCUIT
Filed Jan. 28, 1955
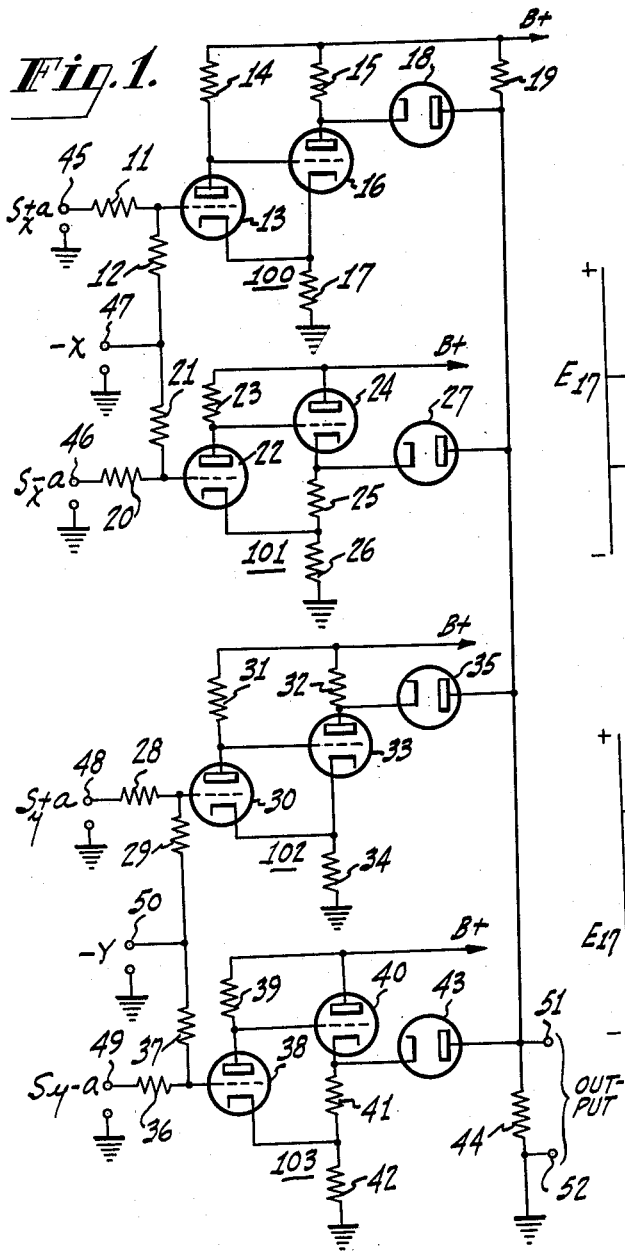
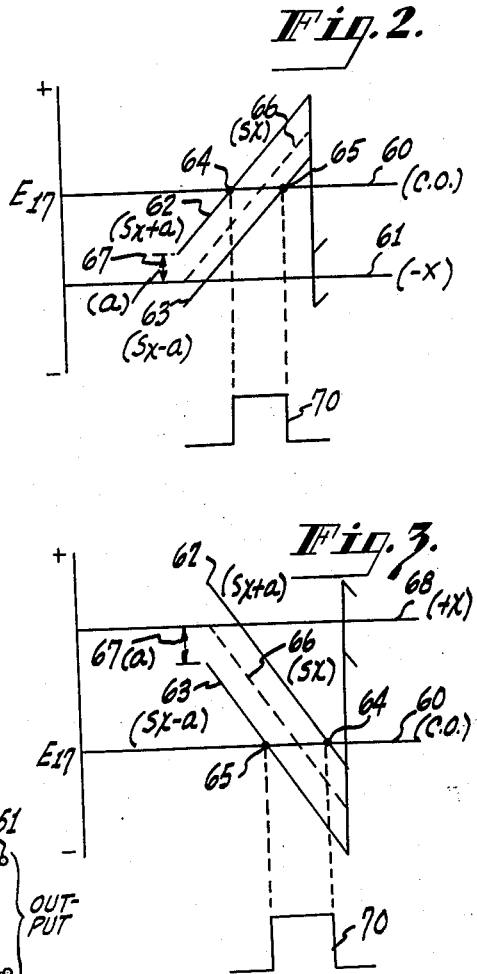
INVENTORS
ROBERT E. WILSON &
WILLIAM E. WOODS
BY J. C. Whittaker
ATTORNEY

United States Patent Office 2,923,818
Patented Feb. 2, 1960

2,923,818

GATE-FORMING CIRCUIT

Robert E. Wilson, Moorestown, and William E. Woods, Haddonfield, N.J., assignors to Radio Corporation of America, a corporation of Delaware Application January 28, 1955, Serial No. 484,676

3 Claims. (Cl. 250—27)

This invention relates to improved gating circuits and, more particularly, to an improved circuit for producing a pulse which may be employed as a gate.

In automatic-track-while-scan radar systems, a circuit which produces a gating pulse when the radar is searching in the immediate vicinity of a given target is desirable. Such a gating pulse may be utilized in many ways, one being to activate circuits for the correction of stored positional data relating to the given target. Another use for a gating pulse is to permit video signals to be applied to the display tube only during the limited gating period, thereby eliminating a considerable amount of noise from the display screen and emphasizing target returns.

Gating signals may also be employed in television for blanking out a small portion of a larger picture area when it is desired to insert another image therein.

Although specially constructed, special-purpose tubes may be employed in gate-forming circuits, conventional tubes are used in this invention.

A primary object of this invention is to provide an improved pulse-forming circuit.

Another object of this invention is to provide an improved circuit which forms a pulse upon the coincidence of at least two independent circumstances.

A further object of this invention is to provide an improved circuit which forms a pulse upon the simultaneous occurrence of any selected number of coincidences of input signal amplitudes with reference voltage levels.

Still another object is to provide an improved pulse-forming circuit in which conventional tubes may be employed.

A further object of this invention is to provide an improved pulse-forming circuit which may be employed as a gating circuit in an automatic-track-while-scan radar system.

The foregoing objects and advantages of the present invention are accomplished in a typical embodiment through the control of the voltage across a portion of an output impedance network by the state of conduction of one or more diodes, each shunting said portion of the impedance network, the state of conduction of each diode being controlled by a separate signal-coincidence-responsive trigger circuit.

In a preferred embodiment of the invention, an impedance, which is part of a voltage-dividing impedance network connected across a source of unidirectional voltage, is shunted by a pair of paralleled branch circuits, each said branch including a diode. In operation, the first diode is normally conducting and the second diode is normally cut off. The output of the circuit is the voltage across the impedance.

Each diode is also coupled to, and its state of conduction controlled by, a separate signal-coincidence-responsive trigger circuit. (The term "state of conduction" used herein refers to one of two states, conduction or non-conduction, and does not refer to magnitude of conduction.) The input to each of the trigger circuits is a set of two independent variable signals, each set comprising at least one signal which differs from the two signals in the other set. When the additive level of the input signals to such a trigger circuit reaches (coincides with) the cut-off bias level of the input tube, the circuit is activated (triggered)—that is, the input tube conducts current and the output tube is simultaneously cut off.

Activating the first trigger circuit cuts off its associated normally-conducting diode (or transforms its state of conduction), thereby instantaneously elevating the value of the voltage across the impedance (the output voltage). Activating the second trigger circuit causes its associated normally-cut-off diode to conduct, thereby instantaneously depressing the output voltage to its initial level. If the second trigger circuit is activated subsequent to the activation of the first, a rectangular positive output pulse is formed.

The circuit may be arranged so that concurrent activation of more than one such trigger circuit is necessary to produce the leading and/or trailing edges of the output pulse.

This invention will be described in greater detail with reference to the accompanying drawing in which similar reference characters apply to similar elements, and in which:

Figure 1 is a schematic diagram of a preferred embodiment of a circuit in accordance with this invention;

Figure 2 is a diagrammatic representation of the input waveforms to a pair of signal-coincidence-responsive trigger circuits and the output waveform in accordance with the invention, said waveforms being of assistance in understanding the operation of the invention; and Figure 3 is a diagrammatic representation of the input waveforms to a pair of signal-coincidence-responsive trigger circuits when the direct current input is reversed in polarity to that illustrated in Figure 2.

Referring to Figure 1, triodes are grouped in pairs 13—16, 22—24, 30—33, and 38—40, each pair and its associated resistors forming a signal-coincidence-responsive trigger circuit 100, 101, 102 and 103. The theory of operation of such trigger circuits is described on pages 99 to 103 of Elmore & Sands, Electronics, 1st edition, published by the McGraw-Hill Book Co., Inc.

The operation of the first trigger circuit 100 will be described assuming that only the first and second trigger circuits 100 and 101 are included in the circuit. If no input signal voltage is impressed on the grid-cathode circuit of the input triode 13, the output triode 16 will conduct due to the positive voltage applied to its grid through the input-tube anode resistor 14. The latter is coupled to the positive terminal of the B+ supply voltage source (not shown). The resulting high anode current through the output triode 16 produces a high positive bias voltage across common cathode resistor 17 and this maintains input tube 13 normally cut-off.

The values of the voltage-divider resistors 19, 44, the anode resistors 14, 15 and the cathode resistor 17 are so selected that, when the output tube 16 is conducting, the potential at the anode of the output tube 16 is lower than the potential at the low-potential end of the upper divider resistor 19. Thus, a first diode 18, having its anode connected to the junction of the divider resistors 19, 44 and its cathode connected to the anode of the output tube 16, will conduct current whenever the output tube 16 is conducting.

The operation of the second trigger circuit 101 is similar to that of the first trigger circuit 100, except that a second diode 27 is connected to the cathode of the second tube 24, rather than to its anode as in the first trigger circuit 100. The cathode of the input tube 22 is connected to the junction of series cathode resistors 25, 26 in the cathode circuit of the output tube 24. The anode of the output tube 24 is connected directly to the positive terminal of the supply voltage source. The anode of the input tube 22 is connected through an anode resistor 23 to said positive terminal.

The cathode of the second diode 27 is connected to the cathode of the output trigger tube 24. The second diode anode is connected to the junction of the divider resistors 19, 44. The values of the resistors are selected so that, when the output trigger tube 24 is conducting normally, the potential at the cathode thereof is higher than the potential at the low-potential end of the upper divider resistor 19. Thus, the second diode 27 is cut off whenever the output tube 24 is conducting normally. Semiconductor rectifiers may, of course, be employed in lieu of the diodes 18 and 27.

If the grid-cathode voltage of the input trigger tube 13 of the first trigger circuit 100 is raised through its cut-off value 60 (see Figure 2), the input tube 13 begins to conduct at the instant the grid-cathode voltage coincides with the cut-off bias level 60. This drops the voltage at its anode which is directly connected to the control grid of the output tube 16, thereby decreasing the anode current flowing through the output trigger tube 16. The input tube 13 conducts and the current through the output tube 16 is substantially reduced almost instantaneously, since the entire action is regenerative. Reduction of conduction through the output tube 16 cuts off the flow of current through the first diode 18 and instantaneously raises the potential at the output terminal 51 by effectively opening the conducting path including the first diode 18 and the output tube 16 which shunts the output resistor 44.

If, now, the grid voltage of the input tube 22 of the second trigger circuit 101 is raised through its cut-off value, the same regenerative action as described above in connection with the first trigger circuit 100 occurs, instantaneously initiating conduction in the input tube 22 and substantially reducing the current through the output tube 24. Reduction of current flow through the output tube 24 lowers its cathode potential by decreasing the voltage drop across the upper cathode resistor 25. This lowers the cathode potential of the second diode 27 below its plate potential and causes the second diode 27 to conduct, thereby providing a conducting path across the output resistor 44 and instantaneously lowering the potential at the output terminal 51. Thus, the sequential triggering of the first and second stages 100 and 101 will result in a rectangular pulse signal 70 (see Figure 2) at the output terminals 51—52 of the circuit.

Now consider the case in which the trigger circuits 102 and 103 are included in the circuit. The parameters of these circuits correspond to those of trigger circuits 100, 101 respectively. Circuits 100 and 101 may be termed "X-coordinate" circuits and circuits 102 and 103 "Y-coordinate" circuits for reasons which will be discussed in more detail below.

With the X- and Y-coordinate circuits connected as shown, the leading edge of an output pulse 70 will be formed only when circuits 100 and 102 are actuated in concurrence, that is, one actuated while the output tube of the other is cut off, and circuits 101 and 103 are maintained cut-off. If only one of circuits 100, 102 were triggered, the other circuit would still provide a conducting path across output resistor 44, whereby no sharp voltage drop could occur across the latter. It is to be understood that the term "concurrence of triggerings" does not necessarily refer to triggering both trigger circuits 100 and 102 at the identical instant in time; the term includes a triggering of one of these trigger circuits and then a subsequent triggering of the other, before conduction of the first trigger circuit is returned to its initial state by a second triggering. It will also be noted that to produce the leading edge of a pulse 70, the first and third trigger circuits 100 and 102 must be concurrently activated and that neither the second nor fourth trigger circuits 101 and 103 could have been activated. However, to produce the trailing edge of a pulse 70 after both the first and third trigger circuits 100 and 102 have been activated, it is necessary to activate only one of the other two trigger circuits, either the second or the fourth, 101 or 103, before either the first or the third trigger circuit, 100 or 102 is returned to its initial state.

In the embodiment of the invention illustrated, the output gate (positive-going) is taken from across resistor 44. It will be apparent that an output may also be taken from across resistor 19. In such case, the polarity of the gate is opposite (negative-going) to that of the output across resistor 44.

The trigger circuits 100 and 101 have been called X-coordinate trigger circuits and the trigger circuits 102 and 103 have been called Y-coordinate trigger circuits relative to the input signals which are respectively coupled to them when the entire circuit forms part of an automatic-track-while-scan (ATWS) radar system.

An ATWS radar is a radar which includes circuits that perform the functions of: resolving the geographical positions of target echoes received by a scanning radar antenna into analog voltages representing the X- and Y-cartesian coordinates of said positions; storing said analog voltages in store circuits called X- and Y-coordinate stores, there being one of each type associated with each target, automatically correcting the stored analog voltages for each target on each antenna azimuthal rotation in accordance with changes in target position; and utilizing the stored coordinate analog voltages for some purpose, such as displaying the targets on a radar display tube, or directing the movements of the antenna of a gun-laying radar. In other words, an ATWS radar automatically obtains, and is in a position to deliver, continuous electrical data corresponding to the position of targets. In this case, a direct-current voltage 61 (see Fig. 2), derived from the X-coordinate store for a given target, is applied in reverse polarity to the —X input terminal 47 and thence to the grids of the input tubes 13 and 22 of both trigger circuits 100 and 101.

A second input signal $(S_x+a)$ 62 comprising a small direct-current voltage $(a)$ 67 which is added to the sinusoidally modulated range sweep voltage $(S_x)$ 66 from the radar is applied to the grid of the input tube 13 of the first trigger stage 100, and coupled to the grid of the input tube 22 of the second trigger stage 101 is a third input signal $(S_x-a)$ 63 comprising an identical small direct-current voltage $(a)$ which is subtracted from the sinusoidally modulated range sweep voltage $(S_x)$ 66 from the radar. The range sweep voltage of the radar is modulated relative to the angle of azimuth of its rotating antenna so that the modulated voltage is a series of sawtooth voltages $(S_x)$ 66 whose amplitudes vary sinusoidally as the antenna rotates.

Similarly, the Y-coordinate stages 102 and 103 have a common direct-current input $(-Y)$ which is the negative of the stored analog of the Y-coordinate of the location of the given target and separate inputs $(S_y+a)$ and $(S_y-a)$ corresponding to a cosinusoidally modulated range sweep voltage $(S_y)$ from the radar plus or minus a small direct-current voltage $(a)$.

Referring to Figure 2, a composite waveform of the signal inputs to the input tubes 13 and 22 of the X-coordinate trigger circuits 100 and 101 is illustrated. Since the cut-off voltage of the input tubes 13 and 22 is small compared to the amplitude of the range sweep voltage, the cut-off voltage may be considered as substantially equivalent to zero volts between cathode and grid.

At any given angle of azimuth of the antenna, a range sweep voltage $(S_x)$ 66 having an amplitude in proportion to the sine of the angle of azimuth is developed. The range sweep voltage, or range sawtooth, is a sawtooth voltage supplied to the display tube in radars which employ a plan-position-indicator (P.P.I.) type of presentation of target echoes. The range sweep voltage sweeps the electron beam radially outward from the center of the display tube to its periphery in time synchronism with the radiated pulse so that the radial position of the beam at any given instant corresponds to the distance the radiated pulse has travelled from the radar. A small direct-current voltage (a) 67 is added to the range sweep voltage ($S_x$) 66 to form a first input signal ($S_x+a$) 62 and substracted from the range sweep voltage ($S_x$) 66 to form a second input signal ($S_x-a$) 63. The input signal to the grid of the first tube 13 of the first trigger circuit 100 is a composite signal comprising the sum of the first input signal ($S_x+a$) 62 and the negative of the X-coordinate analog 61, and the input signal to the grid of the first tube 22 of the second trigger circuit 101 is a composite signal comprising the sum of the second input signal ($S_x-a$) 63 and the negative of the X-coordinate analog 61.

As the signal 62 at the grid of the input tube 13 reaches the cut-off level 60 at the point 64, the first trigger circuit 100 will be activated and, if the X-coordinate trigger circuits 100 and 101 alone were in the circuit, the leading edge of an output pulse 70 would be formed. Similarly, the trailing edge of the output pulse 70 would be produced a short time later at the point 65 when the signal 63 at the grid of the input tube 22 to the second trigger circuit 101 reached the cut-off level 60.

However, Y-coordinate trigger circuits 102 and 103 are included in the circuit. Thus, an X- and a Y-coordinate trigger circuit, 100 and 102 respectively, must be activated concurrently in order that the leading edge of the output pulse 70 be produced, and either an X- or a Y-coordinate trigger circuit, 101 or 103 respectively, must subsequently be activated concurrently in order that the trailing edge be produced. Note that here concurrent activation of either the X- or Y-coordinate trigger circuit 101 or 103 refers to the triggering of one of these circuits before either the first or third trigger circuit 100 or 101 has been returned to its initial condition. This concurrent activation occurs only when the radar is searching in the immediate vicinity of the last-recorded position of the given target.

It is understood, of course, that the polarities of the stored analogs of the X- and Y-coordinates of the location of a given target may vary in accordance with the location of the target with respect to the radar. The X-coordinate input signal 61 illustrated in Figure 2 is for a target in either quadrant I or quadrant IV, where X-coordinate values are positive. The area surrounding the radar is considered to be divided into four quadrants by a set of two perpendicular axes, the radar being located at the intersection.

If the X-coordinate input signal is for a target in quadrant II or III, it has a negative value, and is impressed as a positive signal 68 (see Figure 3) on the grids of the input tubes 13 and 22 of the trigger circuits 100 and 101. The input tubes 13 and 22 conduct, thereby substantially reducing the currents through the output tubes 16 and 24. This condition results in a normally cut-off state of conduction for the first diode 18 and a normally conducting state for the second diode 27. Triggering, or activation, in this case, causes the first diode 18 to conduct and cuts off the second diode 27.

Referring to Figure 3, and assuming for purposes of illustration that only the first and second trigger circuits 100 and 101 are included in the circuit, when the subtractive signal 63 at the grid of the input tube 22 of the second trigger circuit 101 reaches the cut-off bias level 60 the circuit 101 is activated (triggered). The input tube 22 is cut off, the output tube 24 is caused to conduct and the second diode 27 is cut off. Both diodes 18 and 27 are now cut off and there is a rise in voltage across the output resistor 44.

When the additive signal 62 at the grid of the input tube 13 reaches the cut-off bias level 60, the tube 13 is cut off, thereby causing the output tube 16 to conduct. This allows the first diode 18 to conduct and drops the voltage across the output resistor 44.

What is claimed is:

1. Apparatus for producing an electrical pulse comprising in combination, a voltage dividing impedance network capable of conducting a direct current, connections for applying a voltage across said impedance network, at least two unidirectional current devices effectively shunting a common portion of said impedance network, means including a first signal-coincidence-responsive circuit coupled to one of said current devices to maintain said one device in a normally non-conducting condition, said first signal circuit including a first input tube having a predetermined cut-off bias voltage level, means including a second-signal-coincidence responsive circuit coupled to another of said current devices to maintain said other device in a normally conducting condition, said second signal circuit including a second input tube having a predetermined cut-off bias voltage level, connection means for a plurality of signal sources for each of said circuits for reversing the relative conducting conditions of said devices upon coincidence of predetermined characteristics of said signals with said cut-off bias levels of said input tubes of said signal circuits, and means for deriving output pulses from said network.

2. Apparatus for producing an electrical pulse comprising in combination, a voltage dividing impedance network including at least two directly connected impedance elements, connections for applying a voltage across said impedance network, a pair of unidirectional current devices effectively shunting a common impedance element of said impedance network, means including a first signal-coincidence-responsive circuit coupled to one of said unidirectional current devices to maintain said one device in a normally non-conducting condition, said first signal circuit including a first input active element having a predetermined cut-off bias voltage level, means including a second signal-coincidence-responsive circuit coupled to the other of said unidirectional current devices to maintain said other device in a normally conducting condition, said second signal circuit including a second input active element having a predetermined cut-off bias voltage level, connection means for a signal source coupled to the input active element of each of said circuits for reversing the relative conducting conditions of said unidirectional current devices when the amplitudes of said signals bear predetermined relationships to said cut-off bias levels, and means for deriving output pulses from said network.

3. Apparatus in accordance with claim 2, wherein said unidirectional current devices comprise diodes.

References Cited in the file of this patent

UNITED STATES PATENTS

| | | |
|---|---|---|
| 2,516,201 | Goodwin | July 25, 1950 |
| 2,544,683 | Hoeppner et al. | Mar. 13, 1951 |
| 2,549,780 | Earp | Apr. 24, 1951 |
| 2,597,214 | Woodbury | May 20, 1952 |
| 2,644,887 | Wolfe | July 7, 1953 |
| 2,679,617 | Mullaney et al. | May 25, 1954 |
| 2,710,913 | Sherertz | June 14, 1955 |

OTHER REFERENCES

Article entitled, "Electronics for Cosmic Ray Experiments" by Howlan, Schroeder & Shipman, Jr. pp. 551–556.

The Review of Scientific Instruments, vol. 18, No. 8, August 1947, Electronics by Elmore & Sands, McGraw-Hill 1949, pages 99 to 103.

UNITED STATES PATENT OFFICE
Certificate of Correction

Patent No. 2,923,818                                      February 2, 1960

Robert E. Wilson et al.

It is hereby certified that error appears in the printed specification of the above numbered patent requiring correction and that the said Letters Patent should read as corrected below.

Column 6, lines 7 to 51 inclusive, comprising claims 1 and 2 should appear as shown below instead of as in the patent:

1. Apparatus for producing an electrical pulse comprising in combination, a voltage dividing impedance network capable of conducting a direct current, connections for applying a voltage across said impedance network, at least two unidirectional current devices effectively shunting a common portion of said impedance network, means including a first signal-coincidence-responsive circuit coupled to one of said unidirectional current devices to maintain said one device in a normally non-conducting condition, said first signal circuit including a first input active element having a predetermined cut-off bias voltage level, means including a second-signal-coincidence responsive circuit coupled to another of said unidirectional current devices to maintain said other device in a normally conducting condition, said second signal circuit including a second input active element having a predetermined cut-off bias voltage level, connection means for a signal coupled to the input active element of each of said circuits for reversing the relative conducting conditions of said unidirectional current devices when the amplitudes of said signals bear predetermined relationships to said cut-off bias levels, and means for deriving output pulses from said network.

2. Apparatus for producing an electrical pulse comprising in combination, a voltage dividing impedance network including at least two directly connected impedance elements, connections for applying a voltage across said impedance network, a pair of unidirectional current devices effectively shunting a common impedance element of said impedance network, means including a first signal-coincidence-responsive circuit coupled to one of said current devices to maintain said one device in a normally non-conducting condition, said first signal circuit including a first input tube having a predetermined cut-off bias voltage level, means including a second signal-coincidence-responsive circuit coupled to the other of said current devices to maintain said other device in a normally conducting condition, said second signal circuit including a second input tube having a predetermined cut-off bias voltage level, connection means for a plurality of signal sources for each of said circuits for reversing the relative conducting conditions of said devices upon coincidence of predetermined characteristics of said signals with said cut-off bias levels of said input tubes in said signal circuits, and means for deriving output pulses from said network.

Signed and sealed this 26th day of July 1960.

[SEAL]

Attest:
KARL H. AXLINE,
*Attesting Officer.*
                                               ROBERT C. WATSON,
                                               *Commissioner of Patents.*